(12) United States Patent
Brahmadathan et al.

(10) Patent No.: US 7,739,557 B2
(45) Date of Patent: Jun. 15, 2010

(54) METHOD, SYSTEM AND PROGRAM PRODUCT FOR AUTONOMOUS ERROR RECOVERY FOR MEMORY DEVICES

(75) Inventors: Sandeep Brahmadathan, Wappingers Falls, NY (US); Tin-Chee Lo, Fishkill, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 11/763,653

(22) Filed: Jun. 15, 2007

(65) Prior Publication Data
US 2007/0240021 A1    Oct. 11, 2007

Related U.S. Application Data

(63) Continuation of application No. 10/820,178, filed on Apr. 7, 2004, now Pat. No. 7,275,202.

(51) Int. Cl.
G06K 5/04 (2006.01)
G11C 29/00 (2006.01)
G06F 11/00 (2006.01)

(52) U.S. Cl. .................. 714/699; 714/767; 714/768; 714/773; 714/25; 714/42

(58) Field of Classification Search .......... 714/699, 714/767, 768, 773, 25, 42
See application file for complete search history.

(56) References Cited

U.S. PATENT DOCUMENTS

| | | | |
|---|---|---|---|
| 4,831,622 A * | 5/1989 | Porter et al. .............. 714/5 |
| 4,860,192 A | 8/1989 | Sachs et al. | |
| 4,953,164 A * | 8/1990 | Asakura et al. ............ 714/754 |
| 5,455,939 A | 10/1995 | Rankin et al. | |
| 5,617,347 A * | 4/1997 | Lauritzen ................ 365/49.17 |
| 5,784,394 A | 7/1998 | Alvarez, II et al. | |
| 5,883,904 A | 3/1999 | Arimilli et al. | |

(Continued)

FOREIGN PATENT DOCUMENTS

JP    62260249 A    11/1987

(Continued)

OTHER PUBLICATIONS

Sohi, Cache Memory Organization to Enhance the Yield of High-Performance VLSI Processors, Apr. 1989, IEEE, vol. 38, No. 4, pp. 484-492.*

(Continued)

*Primary Examiner*—John J Tabone, Jr.
(74) *Attorney, Agent, or Firm*—Steven Chiu, Esq.; Kevin P. Radigan, Esq.; Heslin Rothenberg Farley & Mesiti, P.C.

(57) ABSTRACT

An autonomous error recovery approach is provided for a memory device of a computing system. In response to a request for data, addressed data and associated control information of the memory device are tested for error. If error is detected, the contents of an addressed storage compartment of a second memory device are automatically retrieved and provided responsive to the request. As an example, the memory device may be a cache and the second memory device may be main memory for the computing system.

16 Claims, 7 Drawing Sheets

U.S. PATENT DOCUMENTS

| | | |
|---|---|---|
| 5,912,906 A | 6/1999 | Wu et al. |
| 6,108,753 A | 8/2000 | Bossen et al. |
| 6,163,857 A | 12/2000 | Meaney et al. |
| 6,199,118 B1 | 3/2001 | Chin et al. |
| 6,223,655 B1 | 5/2001 | Shanbaum et al. |
| 6,332,181 B1 | 12/2001 | Bossen et al. |
| 6,571,317 B2 | 5/2003 | Supnet |
| 2003/0131277 A1* | 7/2003 | Taylor et al. ............ 714/5 |

FOREIGN PATENT DOCUMENTS

| JP | 9282105 A | 10/1997 |
|---|---|---|

OTHER PUBLICATIONS

Bossen et al., Power4 System Design for High Reliability, Mar.-Apr. 2002, IEEE, pp. 16-24.*

B.W. Curran, "Improved Memory Multi-Bit Recovery Algorithm", IBM Technical Disclosure Bulletin, vol. 34, No. 3 (Aug. 1991).

C.A. Lemaire et al., "Nonvolatile Write Cache Error Correction", IBM Technical Disclosure Bulletin, vol. 38, No. 4 (Apr. 1995).

* cited by examiner

METHOD, SYSTEM AND PROGRAM PRODUCT FOR AUTONOMOUS ERROR RECOVERY FOR MEMORY DEVICES

CROSS-REFERENCE TO RELATED APPLICATION

This application is a continuation of co-pending U.S. patent application Ser. No. 10/820,178, filed Apr. 7, 2004, and published Oct. 13, 2005 as U.S. Patent Publication No. US/20050229052 A1, entitled "Method, System and Program Product for Autonomous Error Recovery for Memory Devices", by Brahmadathan et al., the entirety of which is hereby incorporated herein by reference.

TECHNICAL FIELD

This invention relates in general to memory devices for computing systems, and more particularly, to autonomous error recovery for a memory device of a computer system.

BACKGROUND OF THE INVENTION

Caches are commonly used to temporarily store values that might be repeatedly accessed by a processor of a computing system. A cache is a high-speed memory device used to reduce the latency associated with repeatedly reading data from a main memory device of the computing system. Thus, the same addressed data may be available from two memory devices of the computing system, i.e., the system's cache and the system's main memory.

A problem arises if the data stored in a memory device such as a cache contains an incorrect value, for example, due to a soft error caused by stray radiation or electrostatic discharge. Thus, it would be desirable to automatically recover the correct value if possible. The present invention provides an autonomous error recovery technique which addresses this problem.

SUMMARY OF THE INVENTION

In one aspect, the shortcomings of the prior art are overcome and additional advantages are provided through the provision of a method of autonomous error recovery for a cache of a computing system. Pursuant to the method, addressed data and associated control information of the memory device are tested for a permanent error within a selected storage compartment of the cache, wherein the addressed data is to be provided responsive to a request therefore by a requester, and wherein the permanent error prevents cache update processing from storing a correct value of the addressed data in the selected storage compartment of the cache. Responsive to detecting the permanent error, the method includes automatically bypassing the cache by retrieving contents of an addressed storage compartment of a main memory of the computing system, and providing the contents of the addressed storage compartment of the main memory to the requester responsive to the request, wherein the cache and the main memory are separate memory devices of the computing system.

In another aspect, a computer system with autonomous error recovery processing for a cache of the computer system is provided. The computer system includes a memory, and a processor in communications with the memory. The computer system is configured to perform a method, which includes: testing addressed data and associated control information of a cache of the computer system for a permanent error within a selected storage compartment of the cache, wherein the addressed data is to be provided responsive to a request therefore by a requester, and wherein the permanent error prevents cache update processing from storing a correct value of the addressed data in the selected storage compartment of the cache; and responsive to detecting the permanent error, automatically bypassing the cache by retrieving contents of an addressed storage compartment of a main memory of the computing system, and providing the contents of the addressed storage compartment of the main memory to the requester responsive to the request, wherein the cache and the main memory comprise separate memory devices of the computing system.

In a further aspect, a computer program product for autonomous error recovery processing for a cache of a computing system is provided. The computer program product includes a storage medium readable by a processing circuit and storing instructions for execution by the processing circuit for performing a method. The method includes: testing addressed data and associated control information of a cache of a computing system for a permanent error within a selected storage compartment of the cache, wherein the addressed data is to be provided responsive to a request therefor by a requester, and wherein the permanent error prevents cache update processing from storing a correct value of the addressed data in the selected storage compartment of the cache; and responsive to detecting the permanent error, automatically bypassing the cache by retrieving contents of an addressed storage compartment of a main memory of the computing system, and providing the contents of the addressed storage compartment of the main memory to the requester responsive to the request, wherein the cache and the main memory comprise separate memory devices of the computing system.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
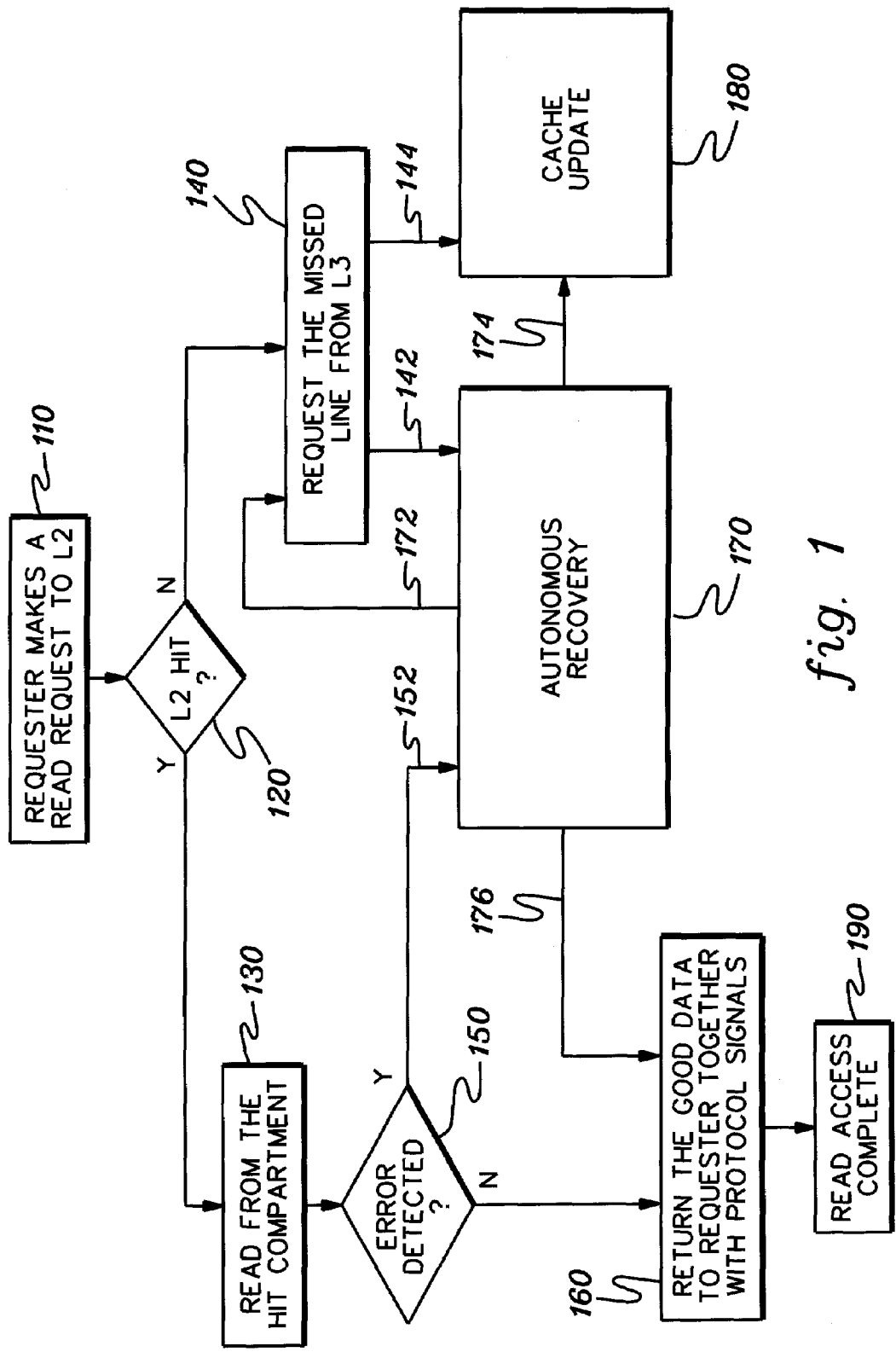
FIG. 1 is a flowchart of one process embodiment for error detection and autonomous error recovery for a memory system of a computing environment, in accordance with an aspect of the present invention.

Referring to FIG. 1, which illustrates a flowchart of one embodiment of autonomous error recovery for a memory system of a computing environment (in accordance with an aspect of the present invention), a requester makes a read request to a memory device 110. In one embodiment, the memory device is assumed to comprise a level 2 cache (L2). In response to the read request, the memory system determines whether there is an "L2 hit" 120, i.e. whether the requested data is stored in memory device L2. If the requested data is not, then the outcome of the inquiry is deemed a "miss", and the requested data (or "missed line" of memory) is requested from a second memory device 140, which functions as a back-up to the memory device to which the request was initially made. In the embodiment illustrated in FIG. 1, the second memory device is a level 3 memory device (L3), such as main memory for the computer environment.

Alternatively, if there is an "L2 hit" (meaning that the requested data is stored in memory device L2), then the requested data (i.e., addressed data) is read from the hit compartment of memory device L2 130. The hit compartment is the storage resource of memory device L2 that is addressed by the request. After reading the addressed data 130, the addressed data and associated control information are tested for errors 150. If an error is detected, processing continues along path 152 to autonomous error recovery 170 transparently to the requester. Otherwise, the requested data is returned to the requester together with appropriate protocol signals 160, and the read access by the requester is complete 190.

Figure 2:
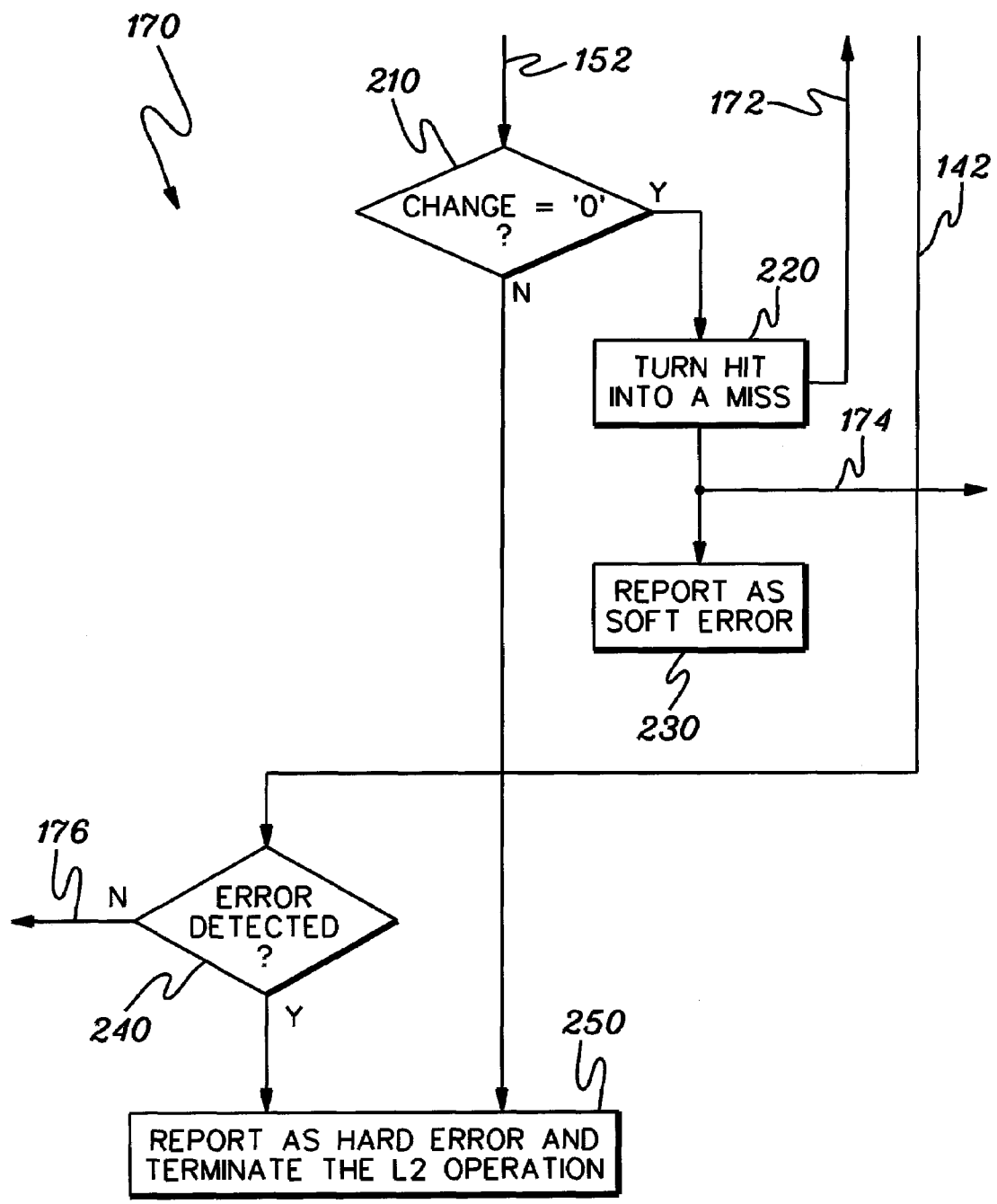
FIG. 2 is a flowchart of one embodiment of autonomous recovery for the process embodiment of FIG. 1, in accordance with an aspect of the present invention.

FIG. 2 illustrates a flowchart of one embodiment of autonomous recovery 170 for the processing embodiment of FIG. 1. Upon entering autonomous error recovery, the control information associated with the addressed (requested) data is tested to determine whether the addressed data in memory device L2 has changed since the data was stored from a corresponding address in the second memory device 210. If the change flag of the control information associated with the addressed data is equal to 0, then the data in memory device L2 and second memory device L3 are the same, and autonomous error recovery continues with processing the request as if a "miss" occurred 220, thereby turning an "L2 hit" with a detected error into an "L2 miss". After turning a hit into a miss, a soft error is reported 230, and the processing continues along path 172 to request the missed line of addressed data from the second memory device L3 140 (see also FIG. 1).

With reference to FIG. 1, following the request for the missed line from the second memory device (L3) 140, the process embodiment of FIG. 1 returns to autonomous recovery processing 170 along path 142 and also to cache update processing 180 along path 144. With reference again to FIG. 2, the data and associated control information obtained from memory L3 as a result of the read request for the missed line is tested for errors 240. If no error is detected, processing continues along path 176, and, as illustrated in FIG. 1, the addressed data is returned to the requester together with appropriate protocol signals 160. However, if an error is detected in the testing of the data and associated control information obtained from memory L3 240, then the error cannot be corrected by autonomous recovery processing 170. A hard error is reported 250, and the L2 memory access operation is terminated 250.

Figure 3:
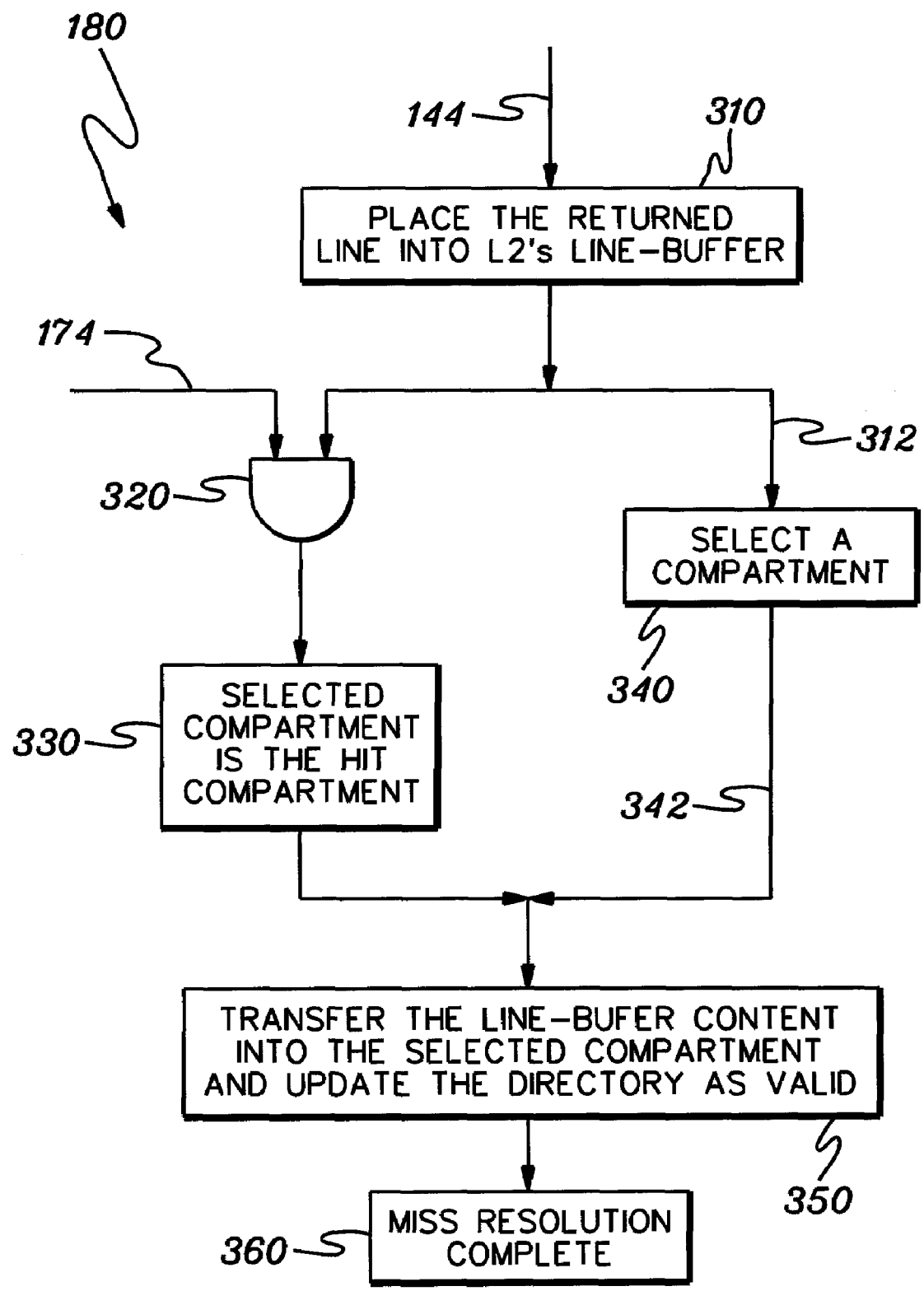
FIG. 3 is a flowchart of one embodiment of cache updating for the process embodiment of FIG. 1, in accordance with an aspect of the present invention.

As discussed above, following the request for the missed line from the second memory device (L3) 140, the processing of FIG. 1 also proceeds to a cache update process 180 along path 144. FIG. 3 is a flowchart of one embodiment of a cache update. Cache update 180 begins with placing the returned line from memory L3 into memory L2's line buffer 310, and a storage compartment in memory L2 is selected in which to store the line returned from memory L3. If the memory system is attempting to recover from an error by turning an "L2 hit" into an "L2 miss" 220, AND logic processing 320 determines whether path 174 has been taken from the hit-to-miss conversion processing 220 (FIG. 2) and a missed line has been requested from memory L3 140 (FIG. 1). In this event, the "hit compartment", i.e. the addressed compartment, in memory L2 is selected as the place in which to store the buffered line obtained from memory L3 330. Alternatively, if the request resulted in a "miss", then the selection of a compartment 340 follows the placement of the returned line from memory L3 into L2's line buffer via path 312, and selection 340 depends on the status of the addressed data in memory L2 and its associated control information. Once a storage compartment of L2 is selected, L2's line buffer content is transferred into the selected compartment, and the associated control information in the directory is updated to indicate that the data stored in the selected compartment is valid 350 to complete the miss resolution processing 360.

It should be noted that the addressed data obtained from the second (or back-up) memory device L3 is provided to the requester via the autonomous recovery processing even if the selected compartment of memory device L2 has a "stuck fault" (i.e., a permanent error). That is, a memory device, which utilizes autonomous recovery processing in accordance with the present invention, returns the addressed data in response to a read request even if a hardware fault prevents the cache update processing from storing the correct data value in the selected storage compartment of memory device L2.

Figure 4:
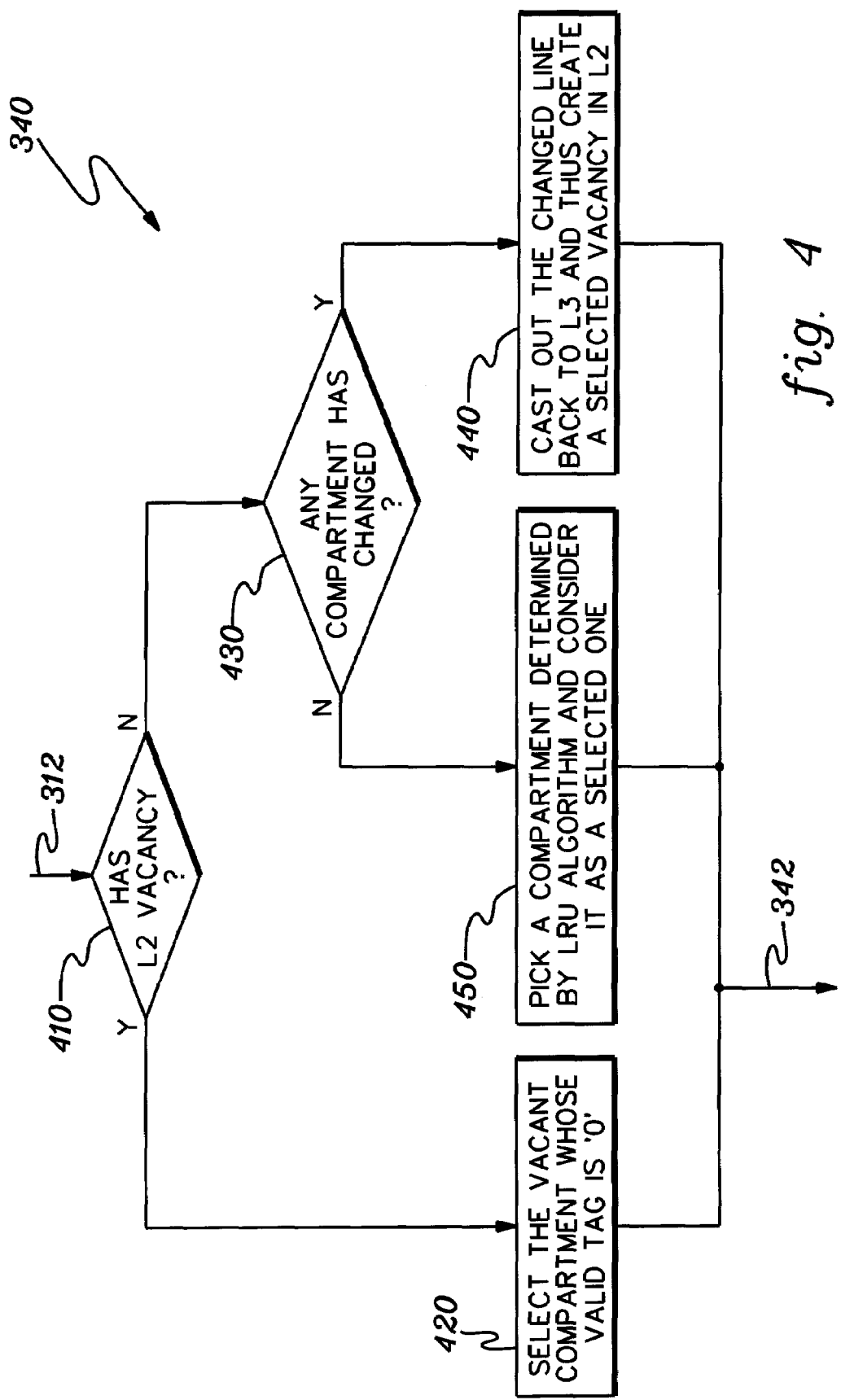
FIG. 4 is a flowchart of one embodiment of selecting a compartment for the cache update process of FIG. 3, in accordance with an aspect of the present invention.

FIG. 4 illustrates a flowchart of one embodiment of selecting a compartment when an L2 memory "miss" occurs 340 for the cache update embodiment of FIG. 3. The control information associated with data stored in memory L2 is tested to determine whether there is a vacant compartment in memory L2 410. If memory L2 has a vacancy, a vacant compartment is selected 420. In one example, a vacant compartment is identified by a valid-data tag equal to 0. If there is no vacant compartment in memory L2, then the control information associated with data stored in memory L2 is tested to determine whether the contents of any storage compartment in memory L2 have changed since they were synchronized with the contents of a corresponding compartment in memory L3 430. If such a change is found, then the contents of the changed L2 compartment are written to memory L3 and the changed compartment is selected for the cache update 440. In effect, the changed line is cast out of memory L2 to create a vacancy because the corresponding contents in memory L3 can no longer be used to correct an error in that line. On the other hand, if no compartment of memory L2 has changed, a least-recently-used algorithm can be used to select a compartment 450 in which to store the contents of the L2 line-buffer to effect a cache update. After the selection of a storage compartment by one of these techniques, cache update processing continues along path 342 to transfer the line-buffer content into the selected compartment 350 in FIG. 3.

Figure 5:
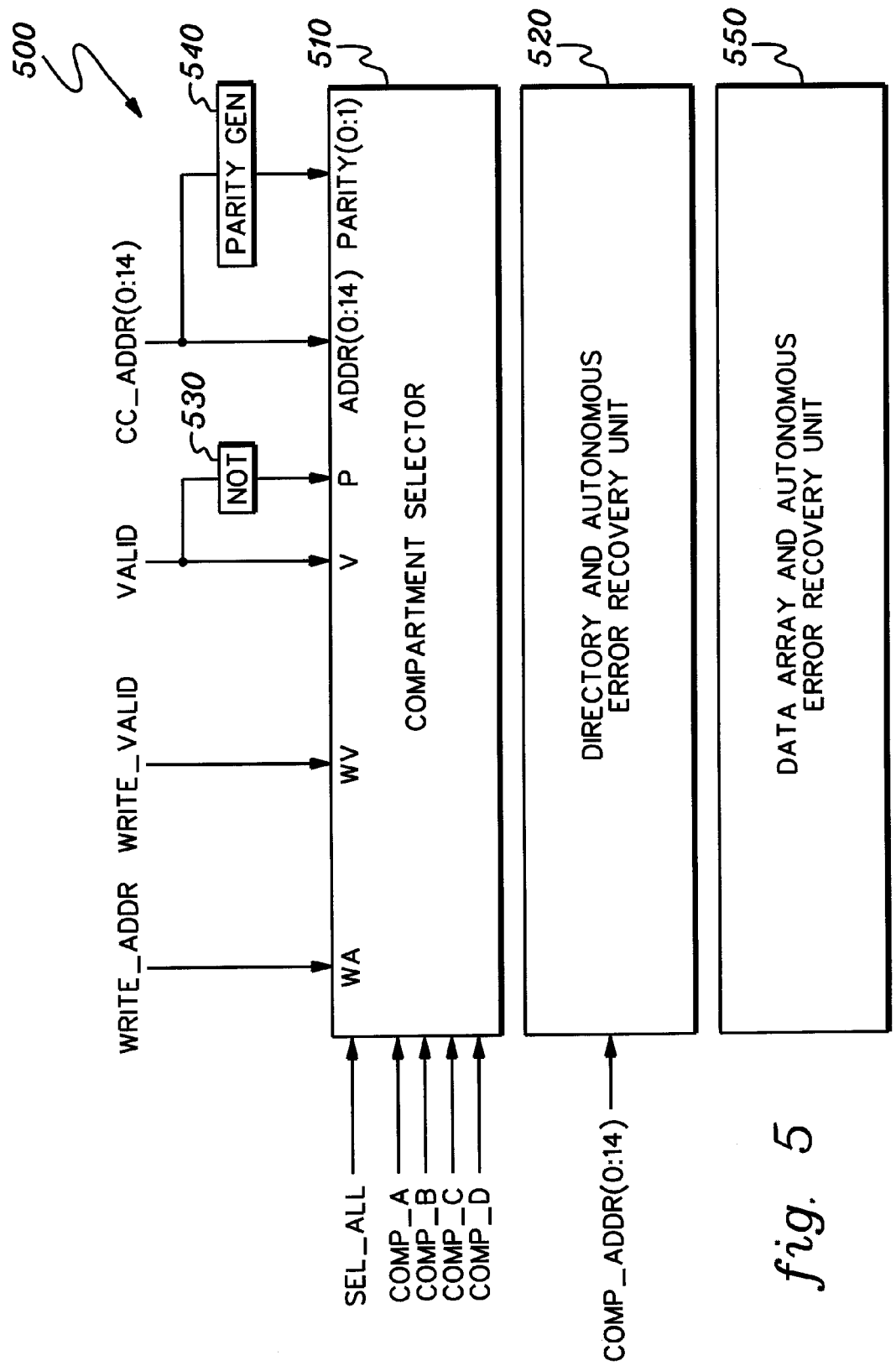
FIG. 5 illustrates one embodiment of a memory device employing autonomous error recovery, in accordance with an aspect of the present invention.

FIG. 5 illustrates one embodiment of a memory device employing autonomous error recovery, in accordance with an aspect of the present invention. Memory device 500 comprises compartment selector 510, directory and autonomous error recovery unit 520, data parity generator logic 540 for generating parity bits for data to be stored in memory device 500, control-information parity logic 530 for generating parity bits for control information associated with the data to be stored, and data array and autonomous error recovery unit 550. The input signals to compartment selector 510 include WRITE_ADDR, WRITE_VALID, VALID, CC_ADDR(0: 14), and directory selection signals SEL_ALL, COMP_A, COMP_B, COMP_C, and COMP_D. The signal CC_ADDR (0:14) comprises the data to be written to memory device 500. The VALID signal indicates whether the data on the CC_ADDR(0:14) input is valid. Signals WRITE_ADDR and WRITE_VALID comprise the write address (i.e. compartment) for the data and an indication of the validity of the current WRITE_ADDR signal. The outputs of data parity generator logic 540 and control-information parity logic 530 are also provided as inputs to compartment selector 510. As illustrated in FIG. 5, data parity generator logic 540 applies a parity-check code, a type of error detection code, to data comprising a 15-bit address, and both the 15-bit address data and resulting parity bits are provided to compartment selector 510 of memory device 500.

The inputs to directory and autonomous error recovery unit 520 include COMP_ADDR(0:14), which carries the address of the compartment for the requested data for a read access by a requester. Control information stored in directory and autonomous error recovery unit 520 is associated with data stored in data array and autonomous error recovery unit 550 of memory device 500.

Figure 6:
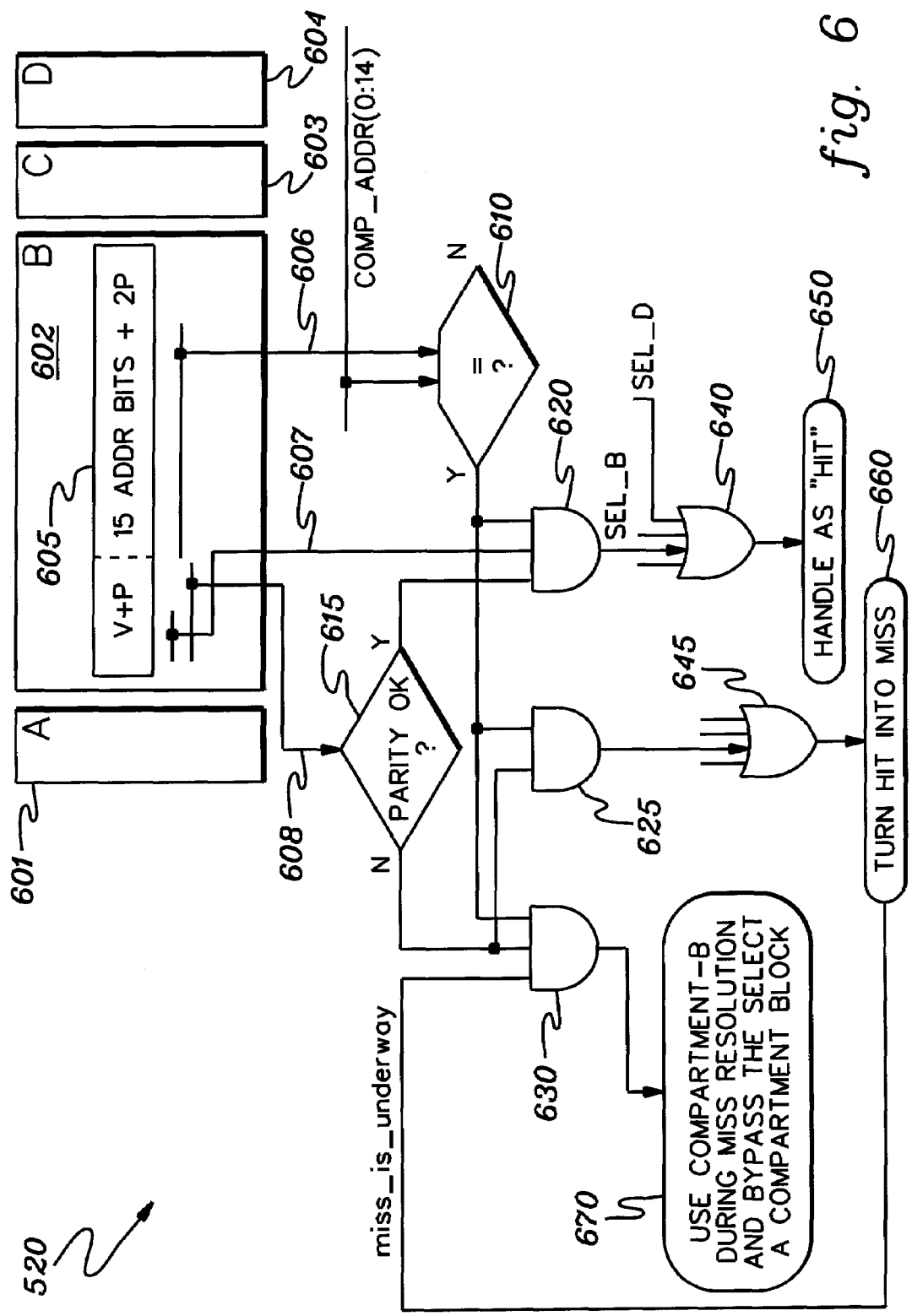
FIG. 6 illustrates one embodiment of the directory and autonomous error recovery unit of FIG. 5, in accordance with an aspect of the present invention.

One embodiment of directory and autonomous error recovery unit 520 of FIG. 5, in accordance with an aspect of the present invention, is illustrated in FIG. 6. Directory control arrays 601, 602, 603, and 604 comprise storage compartments for storing control information associated with data in the memory device. By way of example, one storage compartment 605 of directory control array 602 is shown in FIG. 6. In the example illustrated, the contents of storage compartment 605 include fifteen address bits, two address parity bits, a data-valid bit (V), and one parity bit for the data-valid bit.

Comparison logic 610 compares the input address to directory and autonomous error recovery unit 520 to the address 606 currently stored in storage compartment 605. If the stored and requested addresses are not equal, AND logic gates 620, 625, and 630 are not enabled. Alternatively, if the stored and requested addresses are equal, AND logic gates 620, 625, and 630 are enabled, and the response of directory and autonomous error recovery unit 520 to the request depends on the results of testing the data-valid bit and parity of the control information field of storage compartment 605. In this example the control information field comprises the data-valid bit (V), and one parity bit (P).

If a check of the parity of the control information field 608 by parity-check logic 615 indicates that no error has been detected, the YES output of parity-check logic 615 is a logical 1. In this event, if data-valid bit V 607 is also a logical 1, AND logic gate 620 is activated so the SEL_B signal is a logical 1. This also activates OR logic gate 640 so that the memory device handles the request as a "hit" in control logic 650.

If, on the other hand, a check of the parity of the control information field by parity-check logic 615 indicates that an error has been detected, then the NO output of parity-check logic 615 is a logical 1. In this event, AND logic gate 625 is activated, which causes OR logic gate 645 to be activated so that the memory device acts to attempt to correct the error by treating the request "hit" as if it were a "miss" in control logic 660. Control logic 660 signals that a "miss" has occurred, activating AND logic 630. The activation of AND logic 630 causes miss resolution logic 670 to select storage compartment 605 as the storage compartment to use for updating the contents of memory device 500 during miss resolution processing as discussed in the description of an aspect of the method of the present invention hereinabove with reference to FIG. 3.

Figure 7:
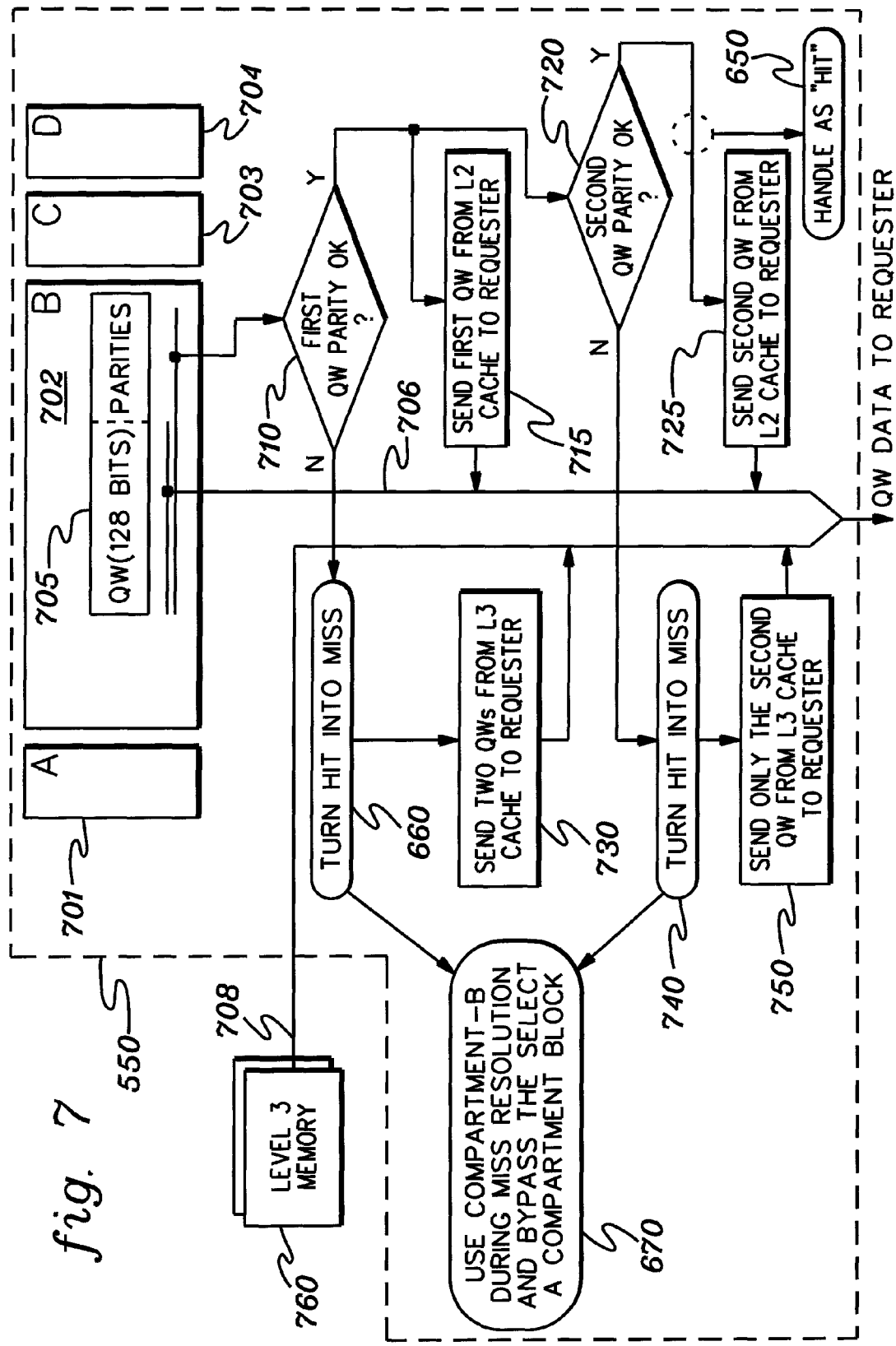
FIG. 7 illustrates one embodiment of the data array and autonomous error recovery unit of FIG. 5 and its interfaces to a second memory device and a data requester, in accordance with an aspect of the present invention.

FIG. 7 illustrates one embodiment of data array and autonomous error recovery unit 550 of FIG. 5 and its interfaces to a second memory device, level 3 memory 760, and a data requester, in accordance with an aspect of the present invention. Data arrays 701, 702, 703, and 704 comprise storage compartments for storing data in the memory device. The data stored in arrays 701, 702, 703, and 704 correspond to associated control information stored in directory control arrays 601, 602, 603, and 604. By way of example, one storage compartment 705 of data array 702 is shown in FIG. 7. In the example illustrated, the contents of storage compartment 705 include a code word comprising a data quad-word having 128 bits and parity bits. The parity bits of the code word are obtained from the application of a parity-check code, a type of error detection code, to the data quad-word.

In the embodiment of data array and autonomous error recovery unit 550 illustrated in FIG. 7, a data value addressed by a requester comprises two data quad-words. If the addressed data value is stored in the memory device, then it is provided as an output to the requester via interface bus 706 as two quad-words, wherein one quad-word is provided per machine clock cycle. By way of example, the first quad-word of the addressed data value is stored in storage compartment 705 of data array 702. The code word, comprising the first data quad-word of the addressed data value and associated parity bits, is provided to parity-check logic 710. If no error is detected by parity-check logic 710, then first quad-word output logic 715 sends the first quad-word of the addressed data value to the requester via interface bus 706, and parity-check logic 720 tests the code word generated from the second quad-word of the addressed data value for error. If parity-check logic 720 does not detect an error, then second quad-word output logic 725 sends the second quad-word of the addressed data value to the requester via interface bus 706, and control logic 650 handles the read request as a "hit" without a detected error.

The embodiment of data array and autonomous error recovery unit 550 illustrated in FIG. 7 operates as follows when an error is detected in the requested data value. The processing of data array and autonomous recovery unit 550 of this embodiment detects two distinct error events—a detected error in the first quad-word of the addressed data value and a detected error in the second quad-word of the addressed data value. Although a similar error recovery strategy is used in both situations, each type of error event is handled somewhat differently. If parity-check logic 710 detects an error in the code word corresponding to the first quad-word, control logic 660 handles the request as a "miss" rather than as a "hit" by causing the following processing to occur: (1) miss output logic 730 obtains the first and second quad-words of the requested data value from level-3 memory 760 and sends them to the requester via interface bus 708; and (2) miss resolution logic 670 selects storage compartment 705 as the storage compartment to use for updating the contents of memory device 500 during miss resolution processing.

Alternatively, if parity-check logic 710 does not detect an error in the code word corresponding to the first quad-word of the addressed data value, but parity-check logic 720 does detect an error in the code word corresponding to the second quad-word, first quad-word output logic 715 sends the first quad-word of the addressed data value to the requester via interface bus 706, and control logic 740 handles the request as a "miss" with respect to the second quad-word. Control logic 740 causes quad-word-miss output logic 750 to obtain the second quad-word of the requested data value from level-3 memory 760 and send it to the requester via interface bus 708. Control logic 740 also causes miss resolution logic 670 to select the storage compartment of data array and autonomous recovery unit 550 in which the second quad-word is stored as the storage compartment to use for updating the contents of memory device 500 during miss resolution processing.

In another example of the embodiment of data array and autonomous recovery unit 550 illustrated in FIG. 7, the parity bits of the code word corresponding to a quad-word of the addressed data are obtained by applying an error correction code, rather than an error detection code, to the data quad-word. When an error correction code is used, parity-check logic 710 and parity-check logic 720 are replaced by logic units that detect uncorrectable errors in the respective code words. In this example, control logic 660 or control logic 740 is invoked to effect a recovery from an uncorrectable error in the code word corresponding to the first quad-word or second quad-word, respectively. If the first and second quad-word either have no error or have correctable errors, then the read request is handled as a "hit", and the addressed data value is provided by the memory device.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An autonomous error recovery method for a cache of a computing system, said method comprising:

testing addressed data and associated control information of a cache of a computing system for a permanent error within a selected storage compartment of the cache, wherein the addressed data is to be provided responsive to a request therefor by a requester, and wherein the permanent error prevents cache update processing from storing a correct value of the addressed data in the selected storage compartment of the cache; and responsive to detecting the permanent error, automatically bypassing the cache by retrieving contents of an addressed storage compartment of a main memory of the computing system, and providing the contents of the addressed storage compartment of the main memory to the requester responsive to the request, wherein the cache and the main memory comprise separate memory devices of the computing system, wherein the addressed data comprises a first quad-word of an addressed data value and a second quad-word of the addressed data value, and wherein the automatically bypassing the cache and retrieving further comprises handling the request as a miss if the permanent error is detected in a code word corresponding to the first quad-word of the addressed data, and if the permanent error is detected in the second quad-word of the addressed data, but not the first quad-word of the addressed data, sending the first quad-word of the addressed data from the cache to the requester, and sending the second quad-word of the addressed data from the main memory responsive to the request, thereby bypassing the cache with the second quad-word.

2. The method of claim 1, wherein the testing and the automatically bypassing the cache and retrieving are transparent to the requester making the request for the addressed data.

3. The method of claim 1, wherein the automatically bypassing the cache and retrieving further comprises processing the request as if the addressed data were missing from the cache if the permanent error is detected by the testing.

4. The method of claim 1, wherein the testing further comprises parity checking the associated control information.

5. The method of claim 1, wherein the testing further comprises detecting an uncorrectable error in a code word corresponding to the addressed data, wherein the code word was generated by applying an error detecting code to data sent to the cache for storage.

6. The method of claim 1, wherein the testing further comprises testing the addressed data and associated control information of the cache for a soft error within the selected storage compartment of the cache, wherein the soft error is distinct from the permanent error, and wherein cache update processing corrects the soft error by storing the correct value of the addressed data from main memory into the selected storage compartment of the cache.

7. A computer system with autonomous error recovery processing for a cache of the computer system, said computer system comprising:

a memory; and a processor in communications with the memory, the computer system being configured to perform a method, the method comprising;

testing addressed data and associated control information of a cache of the computer system for a permanent error within a selected storage compartment of the cache, wherein the addressed data is to be provided responsive to a request therefor by a requester, and wherein the permanent error prevents cache update processing from storing a correct value of the addressed data in the selected storage compartment of the cache; and responsive to detecting the permanent error, automatically bypassing the cache by retrieving contents of an addressed storage compartment of a main memory of the computing system, and providing the contents of the addressed storage compartment of the main memory to the requester responsive to the request, wherein the cache and the main memory comprise separate memory devices of the computing system, wherein the addressed data comprises a first quad-word of an addressed data value and a second quad-word of the addressed data value, and wherein the automatically bypassing the cache and retrieving further comprises handling the request as a miss if the permanent error is detected in a code word corresponding to the first quad-word of the addressed data, and if the permanent error is detected in the second quad-word of the addressed data, but not the first quad-word of the addressed data, sending the first quad-word of the addressed data from the cache to the requester, and sending the second quad-word of the addressed data from the main memory responsive to the request, thereby bypassing the cache with the second quad-word.

8. The computer system of claim 7, wherein the testing and the automatically bypassing the cache and retrieving are transparent to the requester making the request for the addressed data.

9. The computer system of claim 7, wherein the automatically bypassing the cache and retrieving further comprises processing the request as if the addressed data were missing from the cache if the permanent error is detected by the testing.

10. The computer system of claim 7, wherein the testing further comprises parity checking the associated control information.

11. The computer system of claim 7, wherein the testing further comprises detecting an uncorrectable error in a code word corresponding to the addressed data, wherein the code word was generated by applying an error detecting code to data sent to the cache for storage.

12. A computer program product for autonomous error recovery processing for a cache of a computing system, said computer program product comprising:
 a storage medium readable by a processing circuit and storing instructions for execution by the processing circuit for performing a method comprising:
  testing addressed data and associated control information of a cache of a computing system for a permanent error within a selected storage compartment of the cache, wherein the addressed data is to be provided responsive to a request therefor by a requester, and wherein the permanent error prevents cache update processing from storing a correct value of the addressed data in the selected storage compartment of the cache; and
  responsive to detecting the permanent error, automatically bypassing the cache by retrieving contents of an addressed storage compartment of a main memory of the computing system, and providing the contents of the addressed storage compartment of the main memory to the requester responsive to the request, wherein the cache and the main memory comprise separate memory devices of the computing system,
 wherein the addressed data comprises a first quad-word of an addressed data value and a second quad-word of the addressed data value, and wherein the automatically bypassing the cache and retrieving further comprises handling the request as a miss if the permanent error is detected in a code word corresponding to the first quad-word of the addressed data, and if the permanent error is detected in the second quad-word of the addressed data, but not the first quad-word of the addressed data, sending the first quad-word of the addressed data from the cache to the requester, and sending the second quad-word of the addressed data from the main memory responsive to the request, thereby bypassing the cache with the second quad-word.

13. The computer program product of claim 12, wherein the testing and the automatically bypassing the cache and retrieving are transparent to the requester making the request for the addressed data.

14. The computer program product of claim 12, wherein the automatically bypassing the cache and retrieving further comprises processing the request as if the addressed data were missing from the cache if the permanent error is detected by the testing.

15. The computer program product of claim 12, wherein the testing further comprises parity checking the associated control information.

16. The computer program product of claim 12, wherein the testing further comprises detecting an uncorrectable error in a code word corresponding to the addressed data, wherein the code word was generated by applying an error detecting code to data sent to the cache for storage.

* * * * *